United States Patent [19]
Slegt et al.

[11] Patent Number: 6,084,216
[45] Date of Patent: Jul. 4, 2000

[54] HEATING VESSEL AND METHOD OF CONTROLLING THE HEATING ELEMENT OF SUCH A VESSEL

[75] Inventors: Sander Slegt, Leek; Jacob H. Botma, De Veenhoop; Hendricus J. Duipmans, Hoogeveen; Tjerk K. Bij de Leij, Drachten, all of Netherlands

[73] Assignee: U.S. Philips Corporation, New York, N.Y.

[21] Appl. No.: 09/198,929

[22] Filed: Nov. 24, 1998

[30]   Foreign Application Priority Data

Dec. 2, 1997  [EP]  European Pat. Off. ............... 9730723

[51] Int. Cl.$^7$ ...................................... H05B 1/02
[52] U.S. Cl. .................. 219/497; 219/492; 219/442; 374/102; 99/333
[58] Field of Search .................... 219/494, 497, 219/501, 506, 492, 441, 442; 99/330–336; 374/102, 103

[56]   References Cited

U.S. PATENT DOCUMENTS

| | | | |
|---|---|---|---|
| 4,994,652 | 2/1991 | Wolf et al. | 219/497 |
| 5,103,801 | 4/1992 | Herring et al. | 126/374 |
| 5,490,449 | 2/1996 | Meister et al. | 99/330 |
| 5,844,208 | 12/1998 | Tustaniwskyj et al. | 219/494 |

FOREIGN PATENT DOCUMENTS

| | | |
|---|---|---|
| 95/34188 | 12/1995 | WIPO . |
| 96/25869 | 8/1996 | WIPO . |

*Primary Examiner*—Mark Paschall
*Attorney, Agent, or Firm*—Ernestine C. Bartlett

[57]   ABSTRACT

A liquid heating vessel, such as a kettle, enables user selection of the temperature to which the liquid is to be heated. A thermal sensor is provided which is responsive to the temperature of the heating element. During the heating cycle, the operation of the heating element is interrupted, and temperature samples are obtained as the element cools. Analysis of the temperature decay function of the heating element during the interruption enables the liquid volume to be estimated, as well as the time required to heat the liquid to the selected temperature.

12 Claims, 2 Drawing Sheets

HEATING VESSEL AND METHOD OF CONTROLLING THE HEATING ELEMENT OF SUCH A VESSEL

BACKGROUND OF THE INVENTION

This invention relates to liquid heating vessels, and particularly to the control of the electric heating element provided in such vessels. The invention is particularly concerned with electric kettles and more specifically to electric kettles giving the user the capability of selecting a desired water temperature.

The advantages of enabling water in a kettle or coffee maker to be heated to a temperature lower than the boiling point are well known. For example, it is accepted that a water temperature of 80° to 90° is most appropriate for making coffee. The electric kettle described in WO95/34188 includes a control system which enables the temperature of the water to be maintained at a temperature below boiling point. The vessel described in WO95/34188 uses a bi-metal sensor dedicated to the simmering control and which is responsive to a particular temperature in the vicinity of the bi-metal sensor.

This invention aims to provide a vessel in which a desired temperature may be selected by a user, but which requires a simple arrangement of thermal sensors associated with the heating vessel.

One possible way to enable control of the liquid temperature in a liquid heating vessel is to provide a temperature sensor for the contents of the vessel. However, it is preferred not to require temperature sensors in the interior body of the vessel since electrical connections from the external control circuitry into the body of the vessel are then required and a robust thermal sensor is required. In the case of electric kettles, for example, there has also recently been a shift to flat heating elements with printed heating tracks. This technology opens up the possibility of providing printed thermal sensors adjacent the heating tracks. However, if these thermal sensors are to be responsive to the temperature of liquid in the vessel it is required to space the thermal sensor tracks from the heating tracks, or to provide additional measures to isolate the two sets of tracks. It is therefore desirable to enable control of the liquid temperature based on temperature measurements representing the temperature of the heating element rather than that of the liquid in the vessel.

For example, WO96/25869 discloses an electric kettle having a thick film heating element wherein a temperature sensor is provided which detects the temperature of the heating element track, and temperature samples of the heating track are used to determine when boiling of water in the kettle occurs.

SUMMARY OF THE INVENTION

According to the present invention there is provided a method of controlling the operation of an electric heating element for heating liquid in a vessel to a selectable temperature using signals from a temperature sensor for measuring the temperature of the heating element, the method comprising: obtaining an initial temperature measurement; operating the heating element for a first predetermined period of time; halting the operation of the heating element for a second predetermined period of time, and obtaining periodically temperature sensor measurements; determining from the temperature measurements a further period of time during which the heating element should be operated in order for the liquid to reach the selected temperature; and operating the heating element for the further period of time.

In the method of the invention the operation of a heating element is interrupted for a predetermined period of time and analysis of the temperature response of the heating element during that time enables calculation of the subsequent time required to heat the vessel contents to the selected temperature. The invention thus provides a method which requires a single temperature sensor adjacent the heating element to enable a selectable temperature to be attained.

Preferably the step of determining the further period of time includes the steps of estimating the initial liquid temperature from the initial temperature measurement, estimating the liquid temperature reached resulting from the heating during the first predetermined period of time from the periodic temperature measurements, calculating the consequent temperature rise of the liquid resulting from the heating during the first predetermined period of time, and estimating the volume of liquid in the vessel from the temperature rise.

These calculations assume that the initial temperature measurement of the heating element corresponds to the initial temperature of the liquid in the vessel, which can be assumed to be the case if the heating element has not been operated for a certain period of time.

The liquid temperature reached may be estimated from the periodic temperature measurements by a mathematical best fit technique. With an estimation of the liquid volume and the current liquid temperature, it is possible to calculate the required period of time for heating by considering the energy to be supplied by the heating element in order to raise the liquid and the heating element to the selected temperature. The method may also comprise the step of displaying the time remaining for the liquid in the vessel to reach a selected a temperature.

Preferably, the method also comprises the additional step of cyclically operating the heating element after the further period of time to maintain the liquid in the vessel at the selected temperature.

The invention also provides a liquid heating vessel for electrically heating a liquid comprising an electric heating element, a temperature selector for selecting a temperature to which the liquid in the vessel is to be heated and a temperature sensor for sensing a temperature of the heating element, the vessel being controlled in accordance with the method of the invention.

The invention further provides a liquid heating vessel for electrically heating a liquid comprising an electric heating element, means for controlling the operation of the heating element, a temperature selector for selecting a temperature to which the liquid in the vessel is to be heated, a temperature sensor for measuring a temperature of the heating element, and computing means, wherein the controlling means comprises means for interrupting the heating cycle for a predetermined period of time to provide a period of cooling of the heating element, and wherein the computing means receives temperature sensor signals during the period of cooling and estimates from the temperature sensor signals a heating time for the liquid to reach the selected temperature.

The vessel preferably comprises an electric kettle.

BRIEF DESCRIPTION OF THE DRAWINGS

The invention will now be described by way of example, with reference to and as shown in the accompanying drawings in which.

DESCRIPTION OF THE PREFERRED EMBODIMENTS

Figure 1:
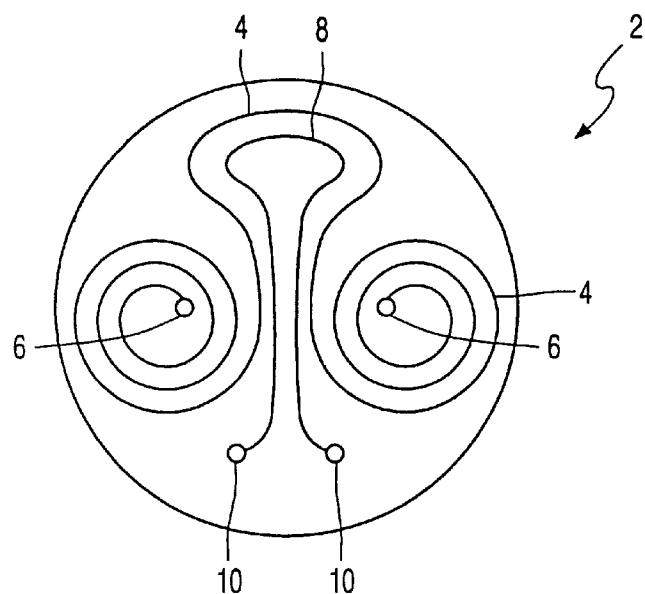
FIG. 1 shows a heating element suitable for use in a vessel of the invention.

FIG. 1 shows a heating element which can be used in a vessel operated according to the invention. The heating element 2 comprises a substrate over which there is provided an insulating dielectric layer and an electrically resistive heating track 4 on the insulating layer. In the example shown in FIG. 1, a single heating track is provided which extends between two contact terminals 6. A thermal sensor also in the form of a resistive track 8 is also provided over the insulating layer and extends between two sensor terminals 10. The use of a sensor track 8 as a thermal sensor enables the thermal sensor and the heating track 4 to be manufactured during the same processing stages, which simplifies the overall manufacture of the heating element. However, one problem of providing a thermal sensor (whether in the form of a track or in the form of a discrete device) on the same side of the heating element substrate as the heating track is that the thermal sensor is not accurately responsive to the temperature of the liquid in the vessel. The liquid in the vessel contacts the opposite side of the substrate to the heating track 4. It is possible to isolate the thermal sensor from the heating tracks to some extent by providing an area around the thermal sensor which is free from heating tracks. However, this reduces the overall area of the substrate on which the heating track may be provided. This makes it difficult to reduce the size of the heating element, which may be desirable for different types of liquid vessels and it is still difficult to predict how accurately the thermal sensor responds to the liquid temperature.

The thermal sensor used in the heating element shown in FIG. 1 is designed to be responsive to the temperature of the heating portion of the heating element rather than the temperature of the liquid. As a result, the thermal sensor track 8 may be provided in close proximity to the heater track 4 and the proportion of the heating element occupied by heating tracks may be increased, resulting in a higher power heating element.

Although a thermal sensor in the form of a track is shown in FIG. 1, any type of thermal sensor may be employed in the present invention. Irrespective of the specific thermal sensor selected, there is no need for the thermal sensor to respond accurately to the liquid temperature.

Figure 2:
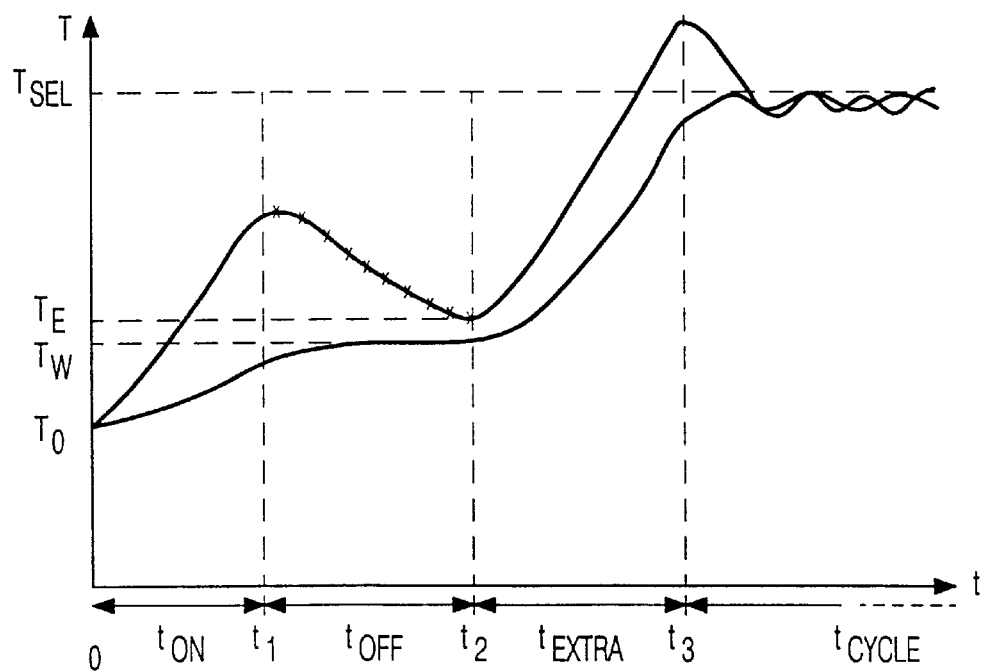
FIG. 2 is a graph showing the heating response of the heating element and of the liquid in a vessel controlled according to the method of the invention.

FIG. 2 shows plots of the temperature of the heating element and of the liquid in the vessel for one cycle of a liquid heating vessel operated in accordance with the invention. For the purposes of explanation, it is assumed in the following description that the liquid to be heated is water, although it should be understood that the invention can equally be applied to vessels for heating other liquids.

As can be seen along the time axis, the operation of the heating element is divided into sections. It is assumed that at time t=0 the heating vessel is turned on, and a temperature has been selected of $T_{SEL}$. The heating cycle involves operating the heating element for a first time period of $t_{ON}$ then interrupting the operation of the heating element off for a period of $t_{OFF}$. Finally the heating element is turned on again for a time $t_{EXTRA}$, which is a sufficient period for the liquid in the vessel to reach the selected temperature. The measurements taken from the thermal sensor comprise an initial temperature measurement at time t=0 and a plurality of temperature samples taken during the period when the heating element is turned off. These samples are represented by crosses in FIG. 2.

The initial temperature sensor measurement at time t=0 can be assumed to measure the temperature both of the heating element and the water in the vessel, which assumes that the heating element has been turned off for a sufficient period of time for the heating element to reach an equilibrium state at the temperature of the water in the vessel. Thus:

$$T_{element}(t=0) = T_{water}(t=0) = T_o \quad (1)$$

where $T_{element}(t=0)$ is the element temperature at time t=0, and $T_{water}(t=0)$ is the water temperature at time t=0.

The heating element is initially operated for a predetermined period of time $t_{ON}$ until time $t_1$. At this point the element is turned off for a predetermined duration $t_{OFF}$. For the duration of the period $t_{OFF}$, some heat is transferred to the water from the element, which is at a higher temperature and some heat is lost from the water to the surroundings. Overall the water temperature rises slightly (as shown) and the heating element temperature falls. An equilibrium will be reached at a certain temperature. For the purposes of subsequent calculations, the method of the invention requires the temperature $T_W$ of the water at the end of the interruption to be estimated. The temperature $T_W$ corresponds approximately to the equilibrium temperature. The samples of the temperature decay curve of the heating element enable an estimate to be made of the temperature $T_W$, since this can be approximated as the temperature which the heating element is approaching. There are various methods of calculating the temperature $T_W$ from the samples taken, and some of these will be described in the following. Once the temperature $T_W$ has been obtained it is possible to determined the volume of water in the vessel using the following equations:

$$\begin{array}{c} \text{Energy to heat water} \\ \text{from } T_O \text{ to } T_W \end{array} = \begin{array}{c} \text{Energy supplied by} \\ \text{heating element} \end{array} - \begin{array}{c} \text{Energy to heat} \\ \text{element from} \\ T_0 \text{ to } T_E \end{array} \quad (2)$$

The equation above basically states that the energy supplied to the heating element is dissipated through heating of the heating element itself and through heating of the water. This ignores the heat loss into the body of the vessel and heat lost as radiation to the air. It is possible to introduce a factor to represent these additional heat losses, but this will not be considered further in this description. Replacing equation (2) with numerical values:

$$V \times \rho \times s(\text{water}) \times (T_W - T_0) = P \times t_{ON} - C(\text{element}) \times (T_E - T_0) \quad (3)$$

where $V$ = volume of water
$\rho$ = density of water
$s(\text{water})$ = specific heat of water
$P$ = heating element power
$C(\text{element})$ = thermal capacity of heating element The power of the heating element and the thermal heat capacity of the heating element must be known in order to implement the method of the invention. Both of these constants can be determined by previous experiment. The specific heat of water is a constant and the three temperature values appearing in equation (3) are all determined by measurement as described above. Thus, only the volume of water V remains unknown, so that this volume may be determined.

Knowledge of the volume of water in the vessel enables calculation of the additional heating time required in order to bring the water to the selected temperature. This time period $t_{EXTRA}$ can be obtained by considering the additional amount of energy required to be supplied by the heating element:

$$\begin{aligned}\text{Additional energy} \\ \text{output from element}\end{aligned} = \begin{aligned}\text{Energy required to} \\ \text{heat water to} \\ \text{selected temperature}\end{aligned} + \begin{aligned}\text{Energy required to} \\ \text{heat element to} \\ \text{selected temperature}\end{aligned} \quad (4)$$

Putting numerical values to equation (4) gives:

$$P \times t_{EXTRA} = (T_{SEL} - T_W) \times V \times s(\text{water}) \times \rho + (T_{SEL} - T_E) \times C(\text{element}) \quad (5)$$

The only unknown parameter in this equation is $t_{EXTRA}$ which can therefore be calculated.

As shown in FIG. 2, the heating element is turned on for the period $t_{EXTRA}$ which gives sufficient energy for the water and the element to be heated to the temperature $T_{SEL}$. In practice, after the time period $t_{EXTRA}$ at time $T_3$ the heating element has overshot the temperature $T_{SEL}$ and the water temperature has not yet attained this temperature. Once the heating element has been turned off some energy is lost from the heating element back into the water resulting in the equilibrium state some time after time $t_3$ at the selected temperature $T_{SEL}$. At this point it is possible to operate cyclically the heating element to maintain the water at the selected temperature.

The cyclic operation of the heating element may be obtained by switching the heating element on for a short predetermined burst each time the heating element temperature drops below the selected temperature. The duration of the burst may be dependent on the selected temperature level or on a combination of the selected temperature and the known water volume.

As described above, various techniques may be employed for determining the temperature $T_W$, which is being approached by the decaying element temperature during the off period $t_{OFF}$. If the duration of the period $t_{OFF}$ is fairly long it can be assumed that the final temperature of the element $T_E$ at the end of the period is equal to the water temperature $T_W$. This assumes that an equilibrium has been reached. However, for this assumption to be reasonably accurate, a long interruption of the heating element operation is required, which is not desirable as it increases the overall time required for the liquid to reach the selected temperature. It is therefore preferred to have a shorter interruption in the heating cycle and to perform a mathematical analysis of the sampling points. Basically, this mathematical analysis involves fitting a mathematical approximation to the temperature samples obtained and extrapolating the mathematical approximation to determine the temperature which is approached by the heating element. For example, the decay function of the heating element temperature may be approximated by an exponential decay function which may be matched to the sampling points obtained using a least squares method. Of course, various other mathematical techniques may be employed, whether relying upon the actual values of the temperature samples obtained, or using differential values of the sampled temperature curve.

Figure 3:
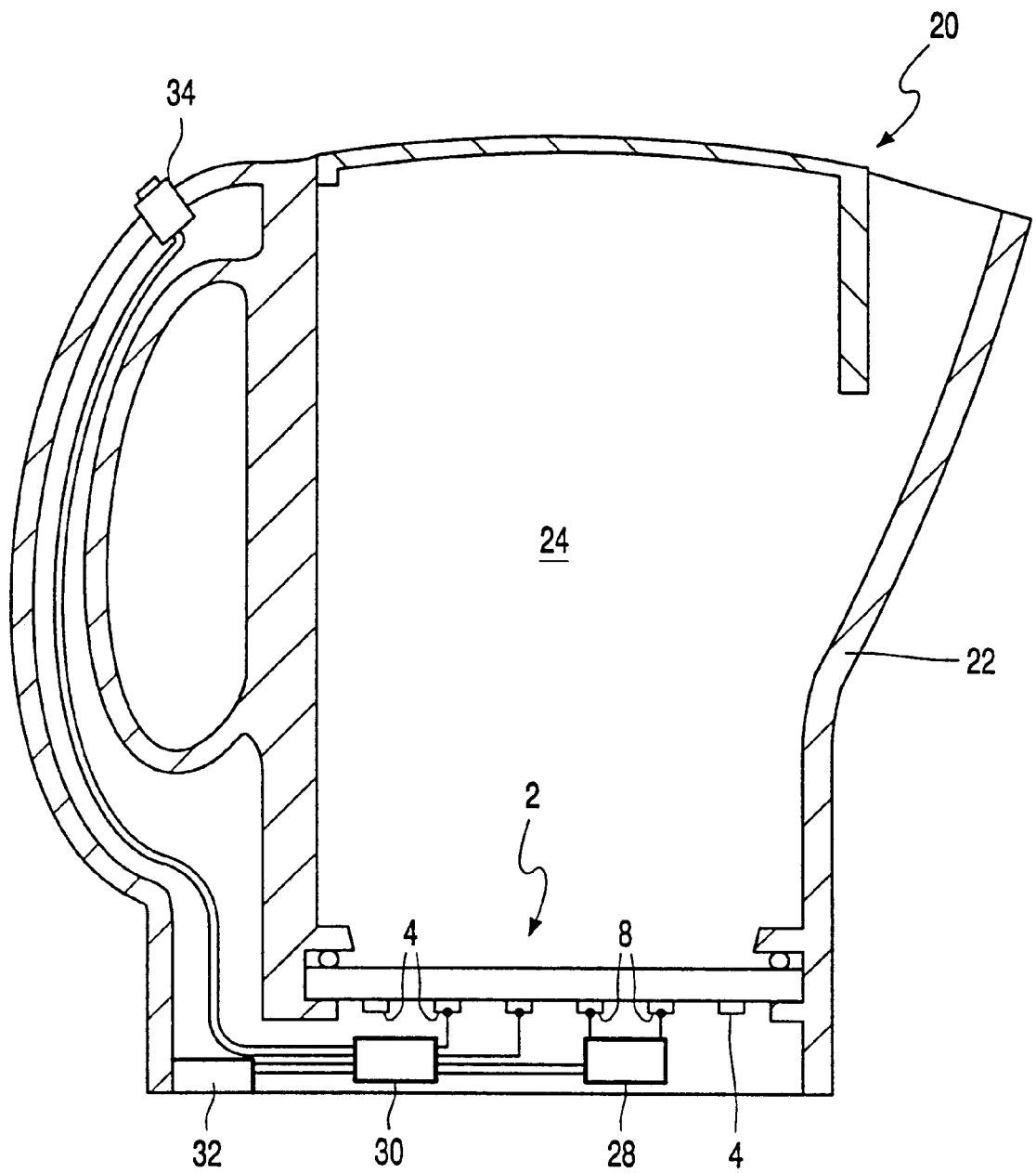
FIG. 3 shows an electric kettle adapted according to the invention.

FIG. 3 shows an electric kettle 20 incorporating the heating element 2 of FIG. 1 and adapted to operate in accordance with the method of the invention. The kettle 20 comprises a body 22 defining a chamber 24 for water to be heated. The heating element 2 defines the base of the chamber 24 and the heating and sensor tracks 4,8 are disposed on the opposite side of the element 2 to the chamber 24. In operation of the heating element, heat from the heating track 4 conducts through the substrate of the heating element to heat the water at the base of the chamber 24. The thermal sensor 8 responds more closely to the temperature of the heating track 4 than to the water in the chamber 24.

The temperature sensor terminals are connected to a sensor circuit 28 which converts the sensor signals into a signal representing the sensed temperature and this signal is supplied to a computing circuit 30 which is provided between the electrical supply 32 to the electric kettle (which may comprise a cordless connector) and the heating track 4. The computing circuit also receives a signal from a temperature selector and on/off control unit 34 which may additionally include a display for indicating the time remaining for the water to reach the selected temperature. The computing circuit 30 controls the supply of electrical current to the heating track 4 in accordance with the method described previously, and also provides the information for display from the control unit 34.

Although the invention has been described with specific reference to an electric kettle, the invention may also equally be applied to other liquid heating vessels which heat a variable quantity of liquid and enable selection of different final temperatures. Furthermore, although the use of a thick film heating element has been described, other types of heating element may equally be appropriate.

What is claimed is:

1. A method of controlling the operation of an electric heating element for heating liquid in a vessel to a selectable temperature using signals from a temperature sensor for measuring the temperature of the heating element, the method comprising:

obtaining an initial temperature measurement;

operating the heating element for a first predetermined period of time;

halting the operation of the heating element for a second predetermined period of time, and obtaining periodically temperature sensor measurements;

determining from the temperature measurements a further period of time during which the heating element should be operated in order for the liquid to reach the selected temperature; and operating the heating element for the further period of time.

2. A method as claimed in claim 1, wherein the step of determining the further period of time includes the steps of estimating the initial liquid temperature from the initial temperature measurement, estimating the liquid temperature reached resulting from the heating during the first predetermined period of time from the periodic temperature measurements, calculating the consequent temperature rise of the liquid resulting from the heating during the first predetermined period of time, and estimating the volume of liquid in the vessel from the temperature rise.

3. A method as claimed in claim 2, wherein the liquid temperature reached is estimated from the periodic temperature measurements by a mathematical best fit technique.

4. A method as claimed in claim 2, wherein the step of determining the further period of time further includes the steps of calculating the energy required to raise the estimated water volume and the heating element to the selected temperature.

5. A method as claimed in claim 1, further comprising the step of displaying the time remaining for the liquid in the vessel to reach the selected temperature.

6. A method as claimed in claim 1, further comprising the additional step of cyclically operating the heating element after the further period of time to maintain the liquid in the vessel at the selected temperature.

7. A liquid heating vessel for electrically heating a liquid comprising an electric heating element, means for controlling the operation of the heating element, a temperature selector for selecting a temperature to which the liquid in the vessel is to be heated, a temperature sensor for measuring a temperature of the heating element, and computing means, wherein the controlling means comprises means for interrupting the heating cycle for a predetermined period of time to provide a period of cooling of the heating element, and wherein the computing means receives temperature sensor signals during the period of cooling and estimates from the temperature sensor signals a heating time for the liquid to reach the selected temperature.

8. A liquid heating vessel for electrically heating a liquid comprising an electric heating element, a temperature selector for selecting a temperature to which the liquid in the vessel is to be heated and a temperature sensor for sensing a temperature of the heating element, and means for controlling the operation of the heating element, the controlling means comprising means for:

obtaining an initial temperature measurement;

operating the heating element for a first predetermined period of time;

halting the operation of the heating element for a second predetermined period of time, and obtaining periodically temperature sensor measurements;

determining from the temperature measurements a further period of time during which the heating element should be operated in order for the liquid to reach the selected temperature; and operating the heating element for the further period of time.

9. An electric kettle for electrically heating a liquid below the boiling point of the liquid comprising an electric heating element, a temperature selector for selecting a temperature to which the liquid in the kettle is to be heated, a temperature sensor for sensing a temperature of the heating element, and means for controlling the operation of the heating element, the controlling means comprising means for:

obtaining an initial temperature measurement;

operating the heating element for a first predetermined period of time;

halting the operation of the heating element for a second predetermined period of time, and obtaining periodically temperature sensor measurements;

determining from the temperature measurements a further period of time during which the heating element should be operated in order for the liquid to reach the selected temperature; and operating the heating element for the further period of time.

10. A method of controlling the operation of an electric heating element for heating liquid in a vessel to a selectable temperature below the boiling point of the liquid using signals from a temperature sensor for measuring the temperature of the heating element, the method comprising:

obtaining an initial temperature measurement;

operating the heating element for a first predetermined period of time;

halting the operation of the heating element for a second predetermined period of time, and obtaining periodically temperature sensor measurements;

determining from the temperature measurements a further period of time during which the heating element should be operated in order for the liquid to reach the selected temperature; and operating the heating element for the further period of time.

11. A liquid heating vessel for electrically heating a liquid comprising an electric heating element, a temperature selector for selecting a temperature below the boiling point of the liquid to which the liquid in the vessel is to be heated and a temperature sensor for sensing a temperature of the heating element, and means for controlling the operation of the heating element, the controlling means comprising means for:

obtaining an initial temperature measurement;

operating the heating element for a first predetermined period of time;

halting the operation of the heating element for a second predetermined period of time, and obtaining periodically temperature sensor measurements;

determining from the temperature measurements a further period of time during which the heating element should be operated in order for the liquid to reach the selected temperature; and operating the heating element for the further period of time.

12. An electric kettle for electrically heating a liquid below the boiling point of the liquid comprising an electric heating element, a temperature selector for selecting a temperature below the boiling point of the liquid to which the liquid in the kettle is to be heated, a temperature sensor for sensing a temperature of the heating element, and means for controlling the operation of the heating element, the controlling means comprising means for:

obtaining an initial temperature measurement;

operating the heating element for a first predetermined period of time;

halting the operation of the heating element for a second predetermined period of time, and obtaining periodically temperature sensor measurements;

determining from the temperature measurements a further period of time during which the heating element should be operated in order for the liquid to reach the selected temperature; and operating the heating element for the further period of time.

* * * * *